(12) United States Patent
Reed et al.

(10) Patent No.: US 12,708,951 B2
(45) Date of Patent: Aug. 18, 2026

(54) PIPE THREADER

(71) Applicant: MILWAUKEE ELECTRIC TOOL CORPORATION, Brookfield, WI (US)

(72) Inventors: Michael C. Reed, Milwaukee, WI (US); Keegan P. Fager, Waukesha, WI (US); Timothy J. Radtke, New Berlin, WI (US); Paul Rossetto, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 883 days.

(21) Appl. No.: 17/745,097

(22) Filed: May 16, 2022

(65) Prior Publication Data

US 2022/0362869 A1 Nov. 17, 2022

Related U.S. Application Data

(60) Provisional application No. 63/189,493, filed on May 17, 2021.

(51) Int. Cl.
*B23G 1/24* (2006.01)

(52) U.S. Cl.
CPC .................................... *B23G 1/24* (2013.01)

(58) Field of Classification Search
CPC . B23G 1/24; B23G 1/22; B23G 1/225; B23G 1/46; B23G 1/52; B23G 5/10; B23G 5/12; B23G 5/04; Y10T 408/90473
See application file for complete search history.

(56) References Cited

U.S. PATENT DOCUMENTS 1,789,411 A 1/1931 Oster et al.
1,852,776 A 4/1932 Hodeaux
2,205,148 A 6/1940 Mayotte
(Continued)

FOREIGN PATENT DOCUMENTS

AT 350352 B * 5/1979 .............. B23G 1/24
CN 2189499 Y 2/1995
(Continued)

OTHER PUBLICATIONS

International Search Report and Written Opinion for Application No. PCT/US2022/029398 dated Oct. 20, 2022 (14 pages).

*Primary Examiner* — Ryan Rufo
(74) *Attorney, Agent, or Firm* — Michael Best & Friedrich LLP

(57) ABSTRACT

A pipe threader includes a housing, an electric motor, a battery, a die holder, and a die locking mechanism. The die locking mechanism receives torque from the electric motor and rotates as a result. A cutting die is received in the die holder and the locking mechanism rotationally locks the cutting die in the die holder. The locking mechanism includes a first lock ring and a second lock ring. The pipe threader includes a drive assembly including an electric motor, a multi-stage planetary transmission that receives torque from the motor, and a worm drive that receives torque from the transmission. The pipe threader includes an inertial measurement unit and an electronic processer. The processor receives data from the inertial measurement unit, generates a relative position of the pipe threader by applying a Kalman filter, determining whether the relative position exceeds a threshold, and decreases the motor speed in response.

8 Claims, 18 Drawing Sheets

(56) References Cited

U.S. PATENT DOCUMENTS

| | | | | |
|---|---|---|---|---|
| 2,770,820 | A | 11/1956 | Adolph et al. | |
| 2,826,950 | A * | 3/1958 | Mcclintock | B23G 1/261 279/144 |
| 3,316,571 | A | 5/1967 | Cutrone | |
| 3,373,637 | A | 3/1968 | Behnke | |
| 4,502,821 | A | 3/1985 | Wagner | |
| 5,203,874 | A * | 4/1993 | Azkona-Ollacarizqueta | B25B 23/00 470/82 |
| 6,305,236 | B1 | 10/2001 | Sturdevant | |
| 7,040,465 | B2 | 5/2006 | Jones et al. | |
| 9,095,917 | B2 | 8/2015 | Patil et al. | |
| 10,953,525 | B2 * | 3/2021 | Hsu | B25B 21/002 |
| 2001/0039857 | A1 | 11/2001 | Sturdevant | |
| 2010/0154603 | A1 | 6/2010 | Cross et al. | |
| 2012/0279362 | A1 * | 11/2012 | Cummings | B25B 13/56 81/57.11 |
| 2015/0209946 | A1 | 7/2015 | Scrivens | |
| 2019/0262960 | A1 | 8/2019 | Lamont et al. | |
| 2019/0283157 | A1 | 9/2019 | VanDaalwyk et al. | |
| 2019/0291247 | A1 | 9/2019 | Gordon et al. | |
| 2019/0314946 | A1 | 10/2019 | Dey, IV et al. | |
| 2020/0189017 | A1 | 6/2020 | Ceroll et al. | |
| 2020/0261959 | A1 | 8/2020 | Wekwert et al. | |

FOREIGN PATENT DOCUMENTS

| | | | | |
|---|---|---|---|---|
| DE | 549303 | C | 4/1932 | |
| DE | 8318378 | U1 | 5/1984 | |
| DE | 3231538 | C2 * | 1/1991 | B23G 1/24 |

* cited by examiner

PIPE THREADER

CROSS-REFERENCE TO RELATED APPLICATIONS

This application claims priority to U.S. Provisional Patent Application No. 63/189,493 filed on May 17, 2021, the entire content of which is incorporated herein by reference.

FIELD OF THE INVENTION

The present invention relates to pipe threaders, and more particularly to powered pipe threaders.

BACKGROUND OF THE INVENTION

Pipe threaders include a die holder to hold a die that cuts threads on a pipe. A motor transmits torque to the die holder to rotate the die with respect to the pipe.

SUMMARY OF THE INVENTION

The present invention provides, in one aspect, a pipe threader including a housing, an electric motor, a battery to power the electric motor, and a die holder that receives torque from the electric motor causing the die holder to rotate, the die holder defining a rotational axis. The pie threader further includes a die locking mechanism configured to rotationally lock a cutting die received within the die holder including a first lock ring on a first side of the die holder. The first lock ring is configured to rotate about the rotational axis with respect to the die holder to engage an outer surface of the die head to selectively mount the die head on the first side of the die holder.

The present invention provides, in yet another aspect, a pipe threader including a housing, a drive assembly including an electric motor, a multi-stage planetary transmission configured to receive torque from the motor, a worm drive configured to receive torque from the transmission, a battery to power the electric motor, and a die holder that receives torque from the worm drive causing the die holder to rotate.

The present invention provides, in yet another aspect, a pipe threader including a housing, an electric motor, an inertial measurement unit, and an electronic processor electrically connected to the electric motor and the inertial measurement unit and configured to receive, from the inertial measurement unit, an angular or gravitational pull acceleration, receive, from the inertial measurement unit, an orientation from a gyroscope, generate a relative tool position of the pipe threader by applying a Kalman filter to the angular or gravitational pull acceleration and the orientation, determine whether the relative tool position exceeds a buffer threshold, and when the relative tool position exceeds the buffer threshold, decrease a speed of the electric motor.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
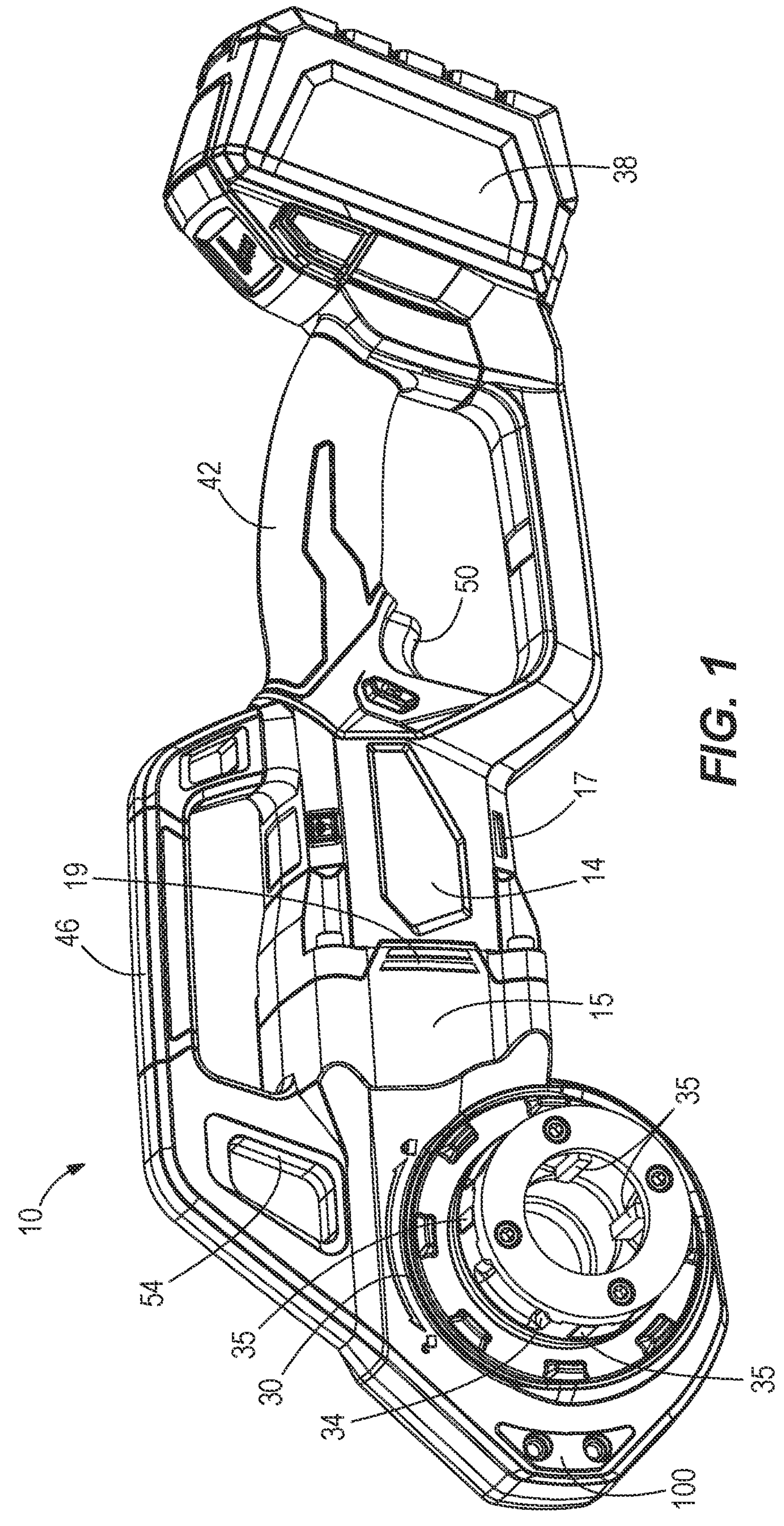
FIG. 1 is a perspective view of a pipe threader in accordance with an embodiment of the invention.
Figure 2:
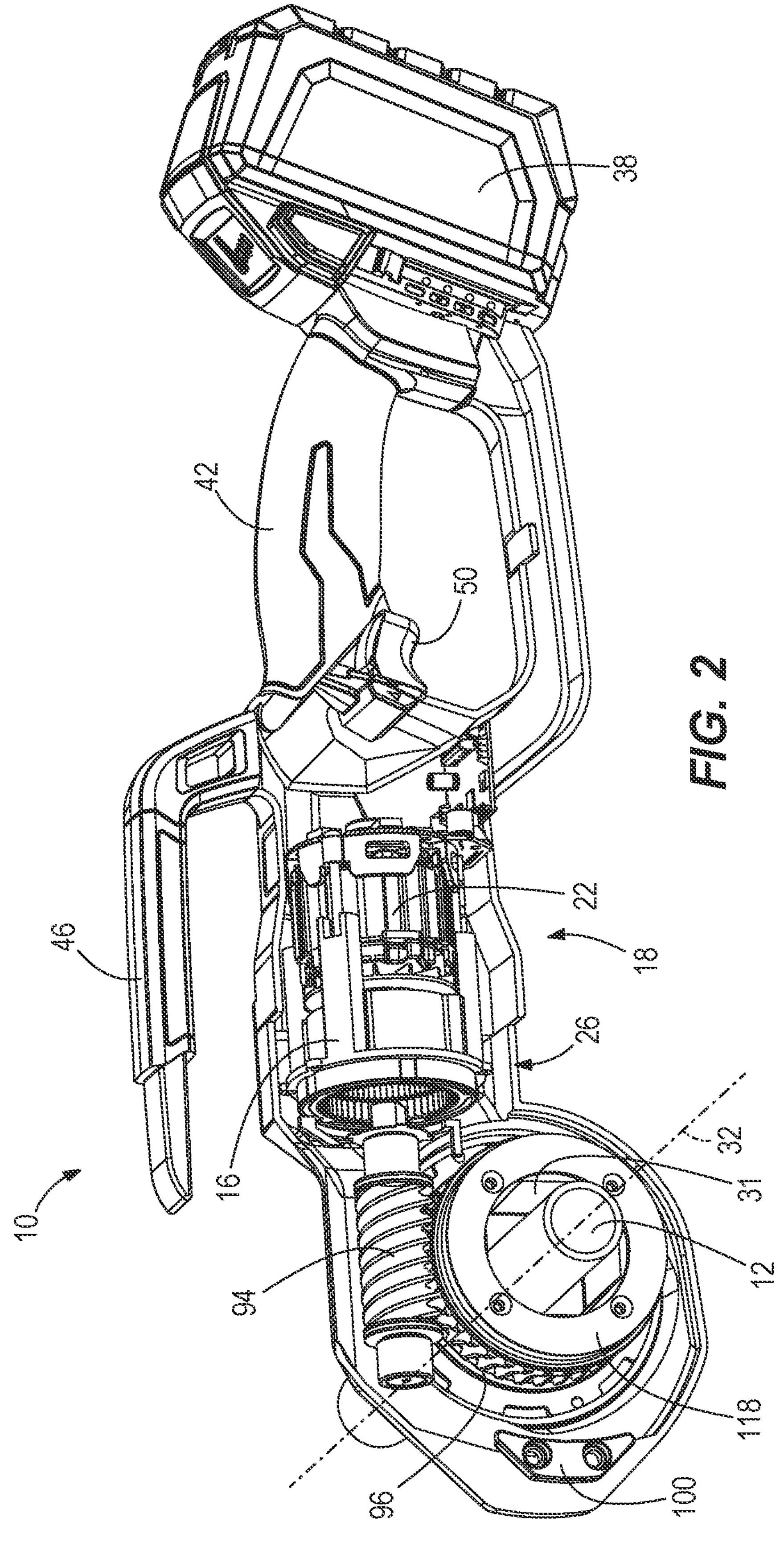
FIG. 2 is a perspective view of the pipe threader of FIG. 1 with portions removed.

FIGS. 1 and 2 illustrate a pipe threader 10 including a rear housing 14, a front housing 15 fastened to the rear housing 14, a gearcase 16 (FIG. 2) within the housings 14, 15, and a drive assembly 18 also positioned within the housings 14, 15. The drive assembly 18 includes a motor 22 (e.g., a brushless direct current motor) having an output shaft 23 (FIG. 4A) and a transmission 26 configured to receive torque from the motor 22. The pipe threader 10 also includes a die holder 30 that selectively receives a die head 34 having a plurality of cutting dies 35 for cutting threads on a pipe 12 (FIG. 2). The die holder 30 and die head 34 are rotatable about a rotational axis 32 (FIG. 2). The motor 22 is powered by a battery pack 38 that is selectively coupled to the rear housing 14. In some embodiments, the battery pack 38 is a lithium-ion battery pack. And, in some embodiments, the battery pack 38 is a power tool battery pack that is interchangeably connectable to the pipe threader 10 and to a plurality of different power tools to supply power thereto. As explained in further detail below, the transmission 26 transmits torque from the motor 22 to the die holder 30, such that the die holder 30 and the attached die head 34 rotate about the rotational axis 32, causing the die head 34 to cut threads on the pipe 12.

With continued reference to FIGS. 1 and 2, the rear housing 14 includes an operating handle 42 and the front housing 15 includes a support handle 46 near the die holder 30 having a connection loop 54. The pipe threader 10 further includes a trigger 50 on the operating handle 42 for activating the motor 22.

Figure 3A:
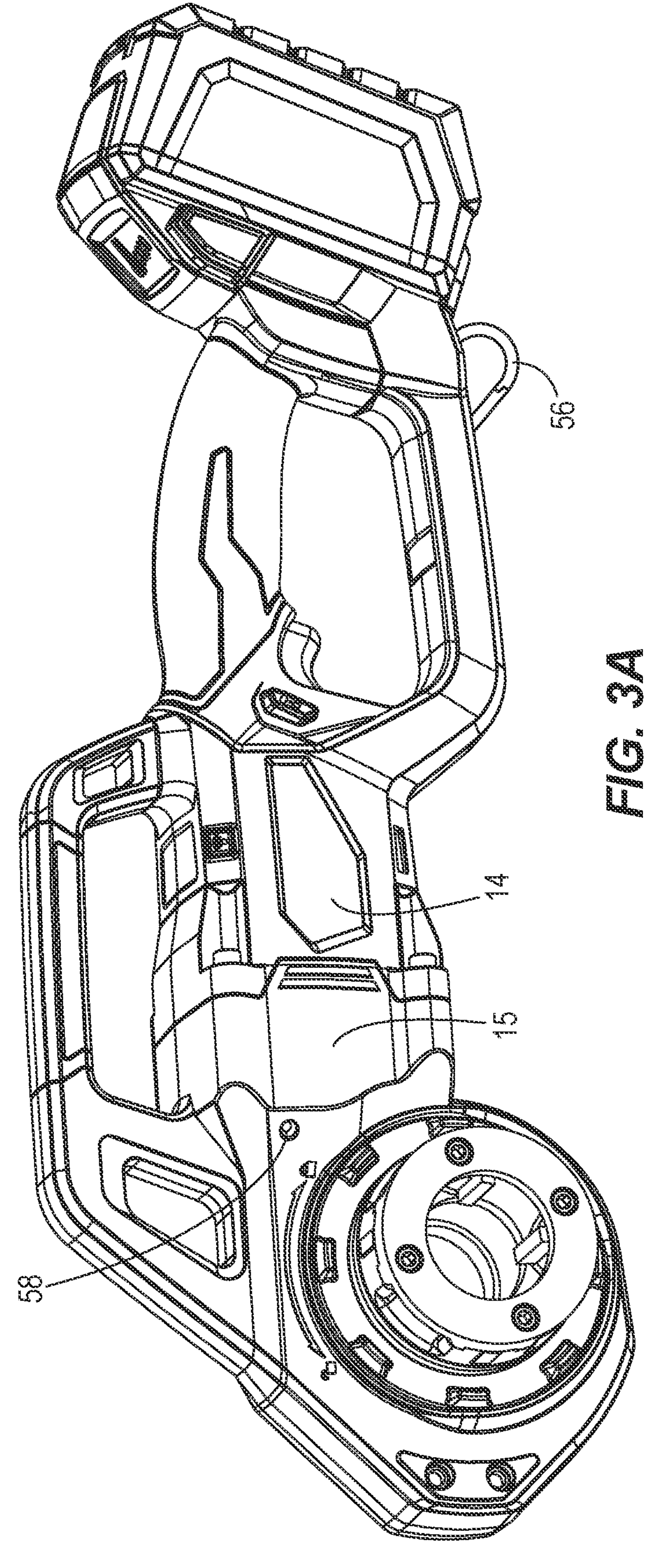
FIG. 3A is a perspective view of a pipe threader in accordance with another embodiment of the invention.
Figure 3B:
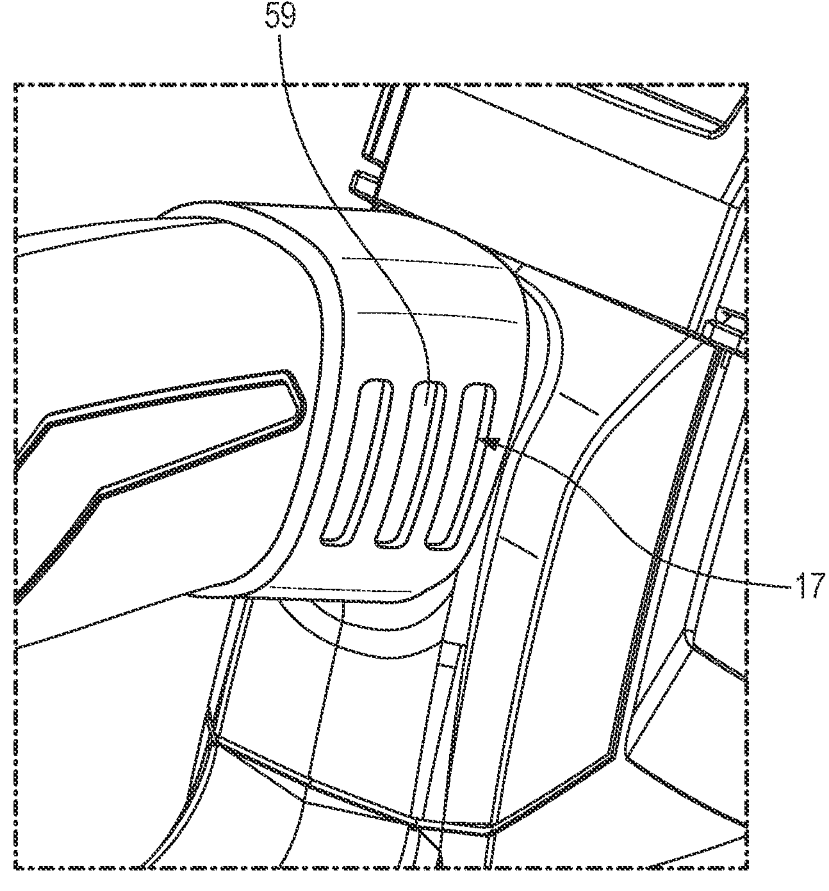
FIG. 3B is an enlarged perspective view of a pipe threader in accordance with another embodiment of the invention.

With reference to FIGS. 3A-3B, in some embodiments, the rear housing 14 can include a hook 56 configured to attach the threader 10 to a pipe stand (not shown) and The hook may be retractable within the housing 14 and/or repositionable to a secondary bypass position when it is not in use. One or more work lights 58, such as light-emitting diodes (LEDs) may be included to illuminate an end of the pipe 12 being threaded. An LED can be arranged singularly on the rear housing 14 or front housing 15, or a plurality of LEDs can be arranged in an array surrounding the die head 34. In some embodiments, the LEDs can be arranged to increase visibility of the pipe 12 around chips and other debris produced from threading the pipe 12. In other embodiments, the housings 14,15 can include metal mesh coverings 59 for covering the air intake vents 17 and air exhaust vents 19 to prevent metal shavings and oil from entering the threader 10.

Figures 5, 6:
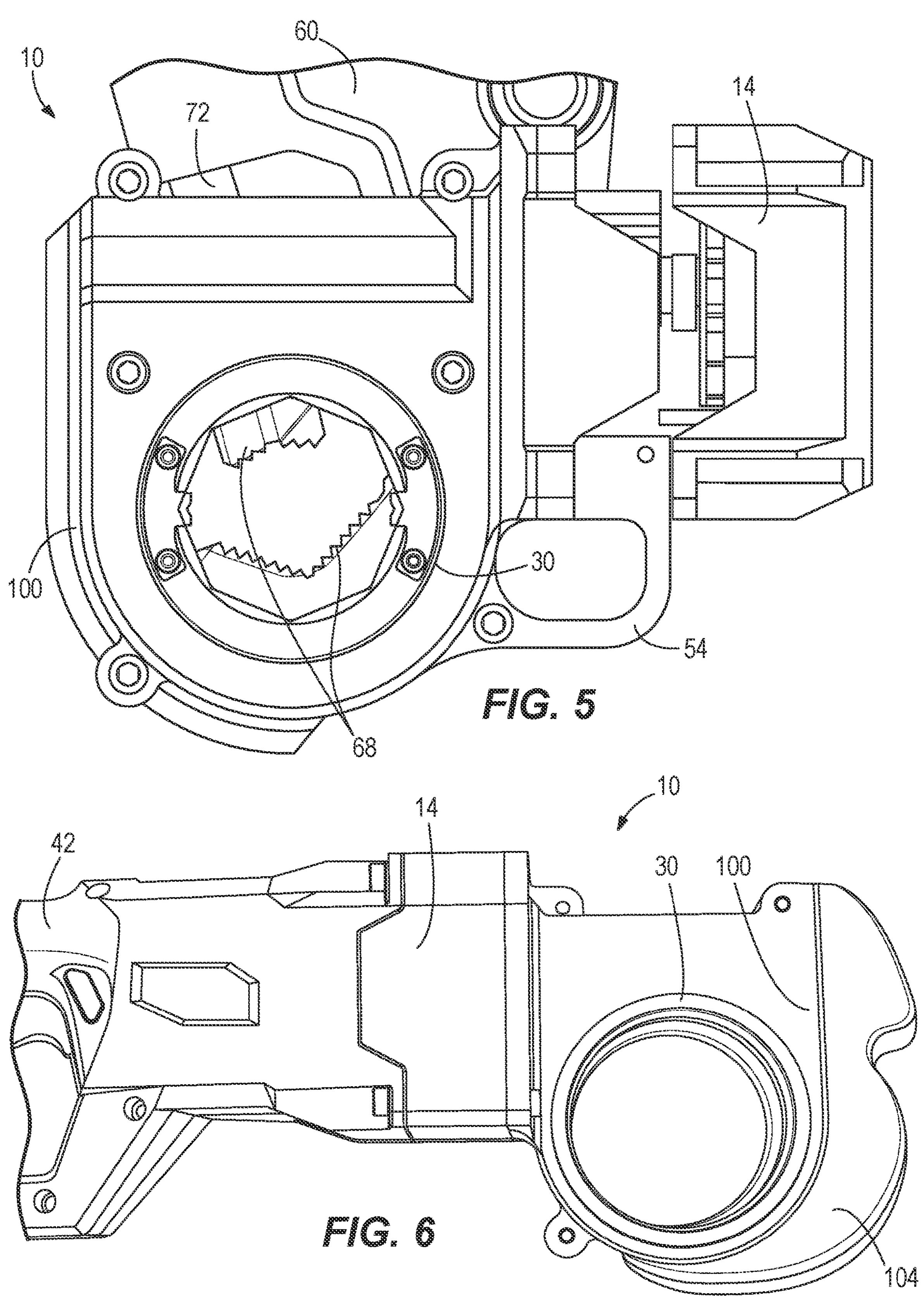
FIG. 5 is an enlarged, side view of a portion of the pipe threader of FIGS. 1 and 2.
FIG. 6 is an enlarged, side view of a portion of the pipe threader of FIGS. 1 and 2.
Figure 18:
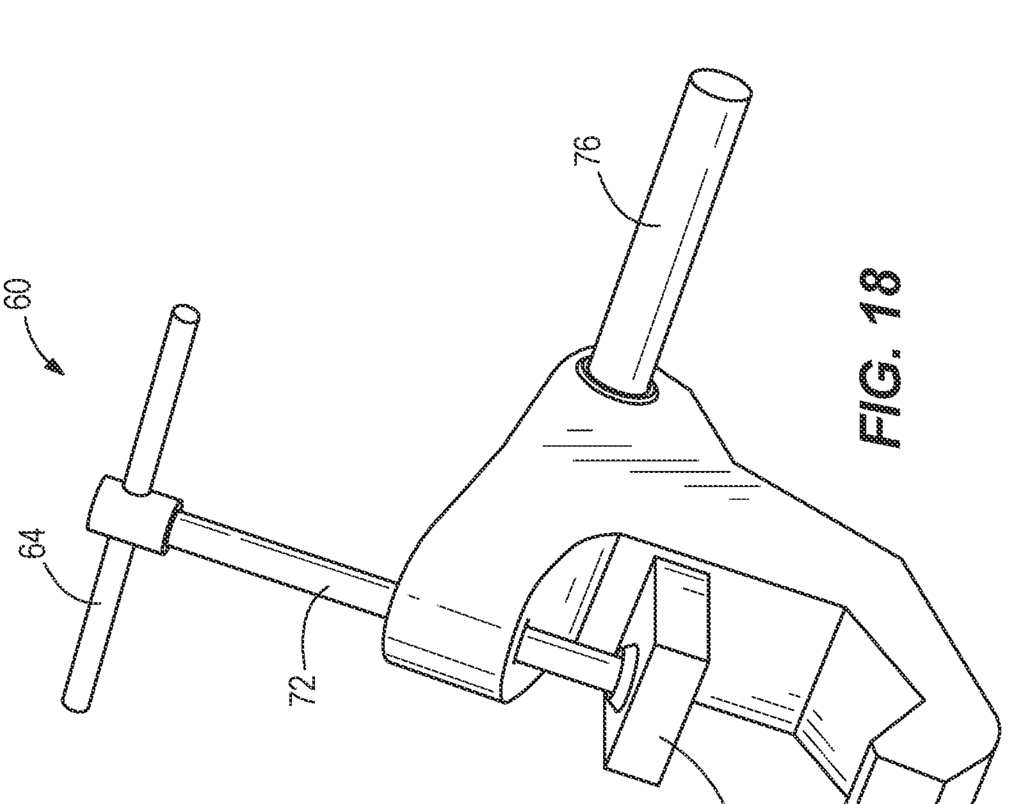
FIG. 18 is a perspective view of a clamping arm for use with the threader of FIGS. 1 and 2.

With reference to FIG. 18, the pipe threader 10 further includes a clamping arm 60 for rotatably securing the threader 10 to the pipe 12 to allow one-handed operation of the threader 10. The clamping arm 60 includes an adjustment handle 64, a plurality of jaws 68, and an adjustment rod 72 configured to clamp the jaws 68 onto the pipe 12 in response to tightening of the adjustment handle 64. The clamping arm 60 further includes a clamping rod 76 extending from the clamping arm 60 configured to be received within the connection loop 54 on the front housing 15 (FIGS. 1 and 5). When the clamping rod 76 is received within the connection loop 54, the threader 10 is rotationally constrained with respect to the clamping arm 60. The clamping arm 60 is configured to absorb the reaction torque exerted on the threader 10 during operation that would normally be absorbed by the user. Since the clamping arm 60 can absorb this reaction torque, this drastically reduces the amount of forces the user has to counteract during operation of the threader 10, which allows for one-handed operation of the threader 10. In some embodiments of the clamping arm 60, the clamping arm 60 can be constructed from lightweight aluminum, enabling the clamping arm 60 to be smaller and lighter than other conventional clamps.

Figure 4A:
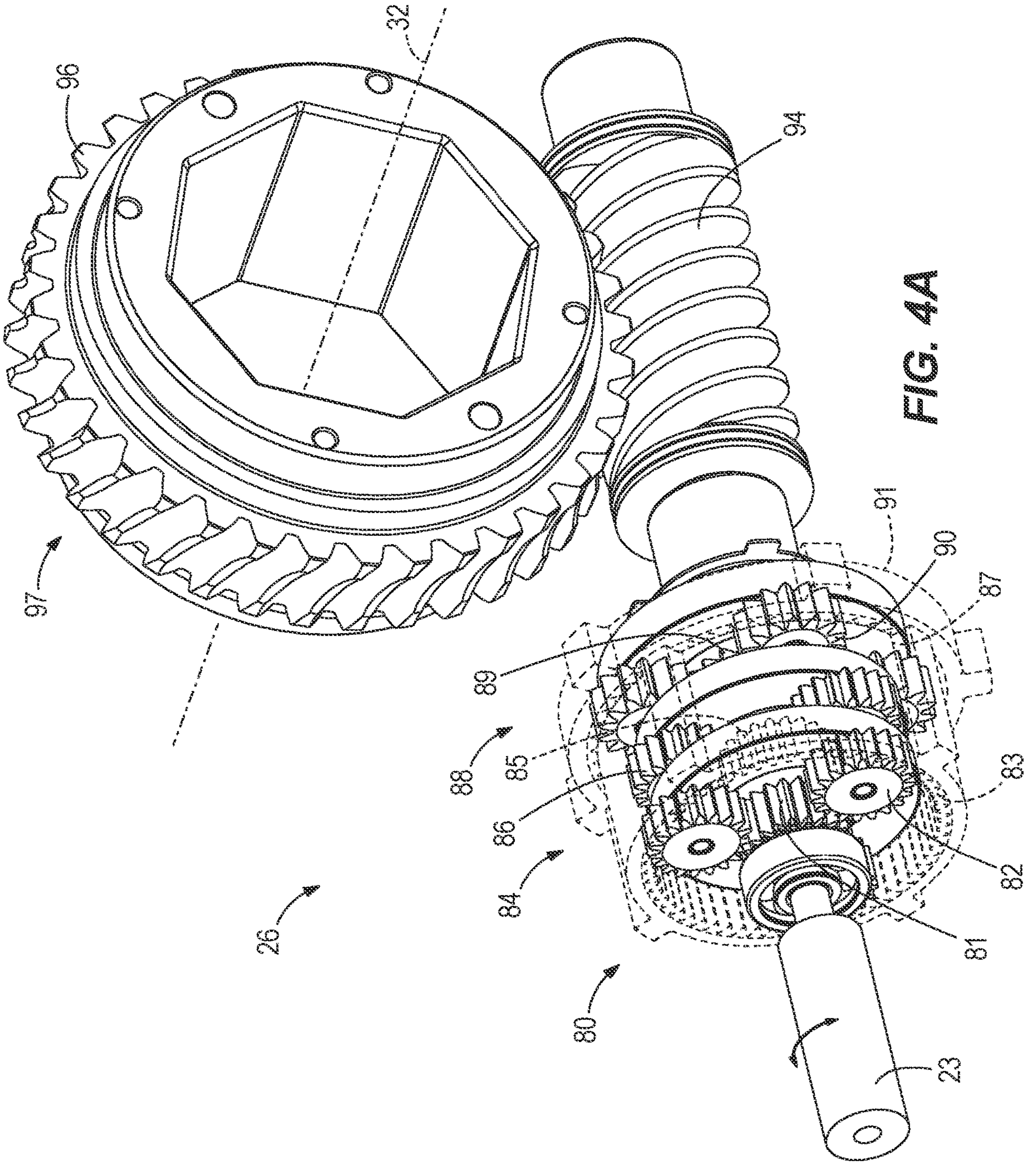
FIG. 4A is a perspective view of a transmission of the pipe threader of FIGS. 1 and 2.

FIG. 4A illustrates the transmission 26, which is configured as a multi-stage planetary gear transmission including the motor output shaft 23 for transmitting torque from the motor 22 to the transmission 26. The transmission 26 includes a first planetary stage 80 having a first sun gear 81 driven by the output shaft 23 configured to drive a plurality of first planet gears 82 (e.g., spur gears). The first planet gears 82 orbit around the first sun gear 81 within a first ring gear 83 supported in the gearcase 16. The amount of speed reduction performed by the first planetary stage 80 of the transmission 26 coincides with a first gear ratio of the transmission 26. The transmission 26 further includes a second planetary stage 84 having a second sun gear 85 integrated with, and rotatably driven by the first sun gear 81 configured to drive a plurality of second planet gears 86. The second planet gears 86 orbit around the second sun gear 85 within a second ring gear 87 supported in the gearcase 16. The second sun gear 85 is configured to rotate at a slower rate than the first sun gear 81 proportional to the first gear ratio of the first planetary stage 80.

With continued reference to FIG. 3A, the transmission 26 further includes a third planetary stage 90 having a third sun gear 91 integrated with, and rotatably driven by the second sun gear 85 configured to drive a plurality of third planet gears 92. The third planet gears 92 orbit around the third sun gear 91 within a third ring gear 93 supported in the gearcase 16. The third sun gear 91 is configured to rotate at a slower rate than the second sun gear 85 proportional to a second gear ratio of the second planetary stage 84. The third planetary stage 90 is configured to transfer torque to a downstream worm drive 97, which is also part of the drive assembly 18, according to a third gear ratio. The worm drive 97 includes a worm pinion 94 and a worm gear 96 having a worm gear ratio. The worm pinion 94 is configured to rotatably drive the worm gear 96 which, in turn, rotatably drives the die holder 30 and die head 34 about the rotational axis 32.

Figure 4B:
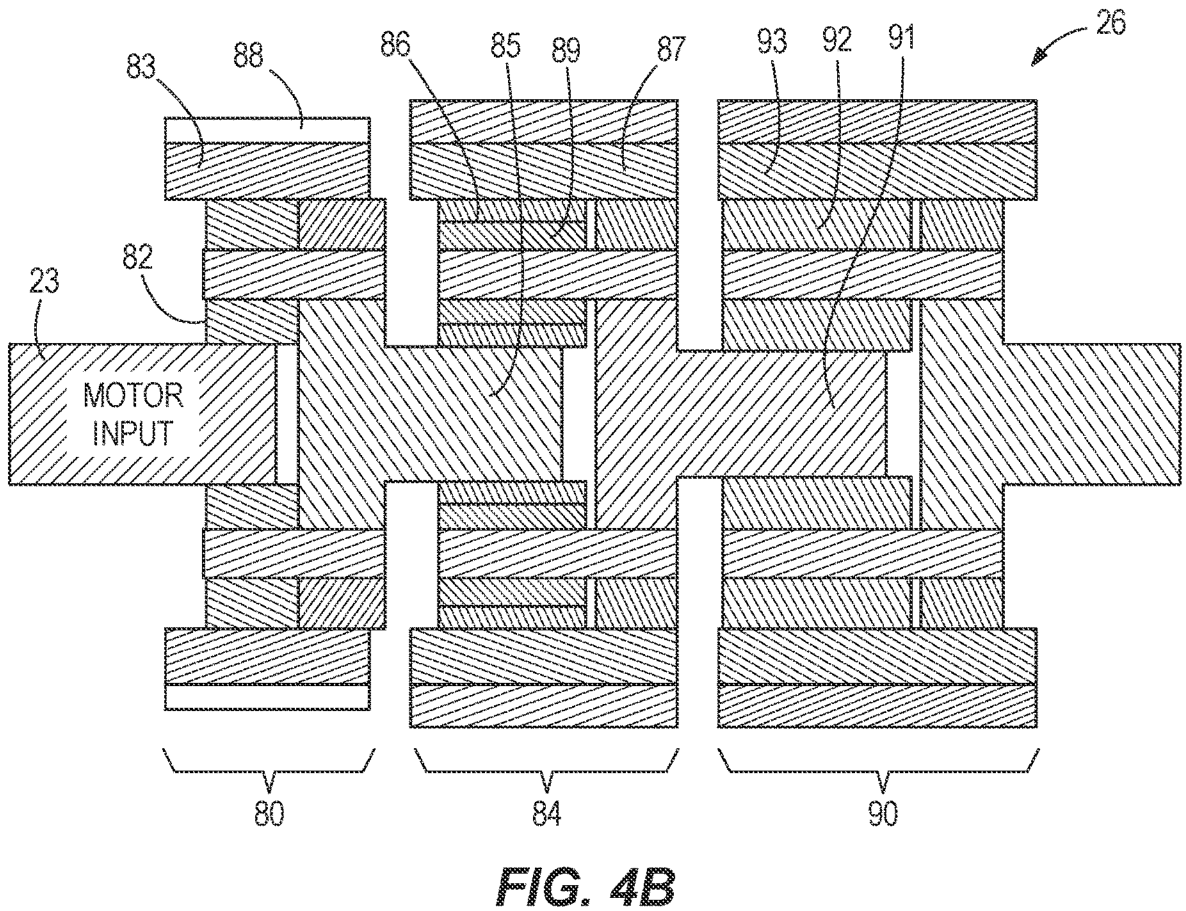
FIG. 4B is a section view of another transmission of the pipe threader according to FIGS. 1 and 2.

With reference to FIG. 4B, in other embodiments, the transmission 26 can include one-way needle bearings 88, 89 to rotate the die holder 30, and thus the die head 34, at different rotational speeds depending on the rotational direction of the die head 34 relative to the pipe 12, such as the one-way needle bearings disclosed in U.S. patent application Ser. No. 16/795,742, filed on Feb. 20, 2020 (now U.S. Patent Application Publication No. 2020/0261959), the entirety of which is incorporated herein by reference. The one-way needle bearings selectively engage (i.e., allow the rotation of the bearings) and disengage (i.e., lock the rotation of the bearings), depending on the direction torque is applied to the supported gears 81. Therefore, the one-way needle bearings allow the user to slowly thread the die head 34 onto the pipe 12 and quickly remove or unthread the die head 34 from the pipe 12 merely by reversing the rotational direction of the motor 22. Furthermore, the one-way needle bearing or bearings enable different transmission paths through the transmission 26, depending on the rotational direction of the motor 22, thus resulting in lower/higher gear reductions from the transmission 26 at this time. Specifically, when the motor 22 is operated in a first or forward direction (i.e. onto the pipe 12) first one-way needle bearing or bearings 88 can surround and lock the first ring gear 83 from rotating, and second one-way needle bearing or bearings 89 surrounding the plurality of first planet gears 82, can unlock, permitting the plurality of first planet gears 82 to rotate about their axes within the interior of the first ring gear 83 in order to provide the first gear reduction 80 of the transmission 26. When the motor 22 is operated in a second direction or reverse direction (i.e., unthreading the die), the first one-way needle bearing or bearings can unlock to permit the first ring gear 83 to rotate, and the second one-way needle bearing or bearings can lock, rotating the plurality of first planet gears 82 and the supported gears 81, providing the second gear reduction 84 of the transmission 26. In other embodiments, the worm gear 96 can be supported by needle bearings.

Figure 4C:
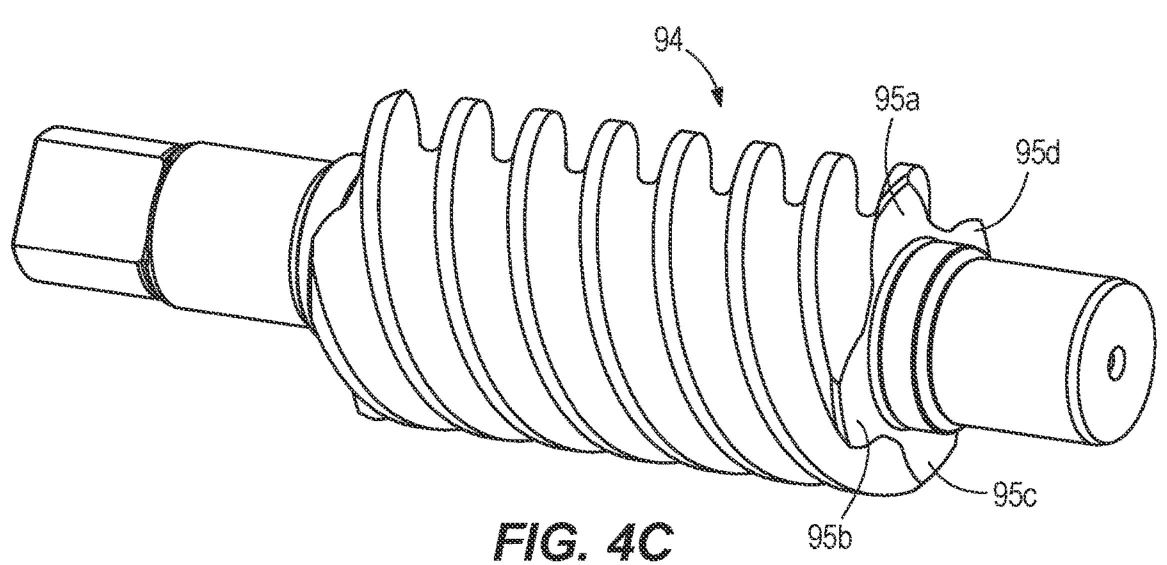
FIG. 4C is a perspective view of a worm pinion of the pipe threader according to FIGS. 1 and 2.

With reference to FIG. 4C, in some embodiments of the transmission 26, the worm pinion 94 can be a four-root, or four-start pinion having four threads 95*a-d*, in which four threads extend about the worm pinion in a helical pattern. In some embodiments of the transmission 26, the first, second, third, and worm gear ratios are configured to be 100:1, or less than 100:1.

By utilizing a multi-stage planetary transmission 26 and the worm drive 97, the overall size and length of the gearcase 16 can be reduced, without sacrificing torque output, compared to known prior-art threaders. This allows the threader 10 to be more easily portable and compact so users can fit the threader 10 into more enclosed work areas.

FIG. 5 illustrates the pipe threader 10 according to another embodiment where the connection loop 54 for receiving the clamping rod 76 of the clamping arm 60 is located on the bottom of the threader 10. Because the connection loop 54 is located on the bottom of the threader 10, this allows for a more compact construction eliminating the section of the support handle 46 located above the die holder 30. Additionally, by removing the excess material from the support handle 46, the threader 10 is lighter which makes it easier for the user to operate the threader 10 with one hand.

FIG. 6 illustrates the threader 10 according to another embodiment including a hilt portion 100 located adjacent the die holder 30. The hilt portion 100 includes an ergonomic gripping area 104 for the user to grip during operation of the threader 10. The gripping area 104 is shaped such that the user has enough space to support the weight of the threader 10 (ideally with their thumb and palm), while simultaneously providing enough space for the user to push on the tool to counteract reaction forces provided by the torque from the motor 22 as the threader 10 is forming threads on the pipe 12.

Figures 7, 8:
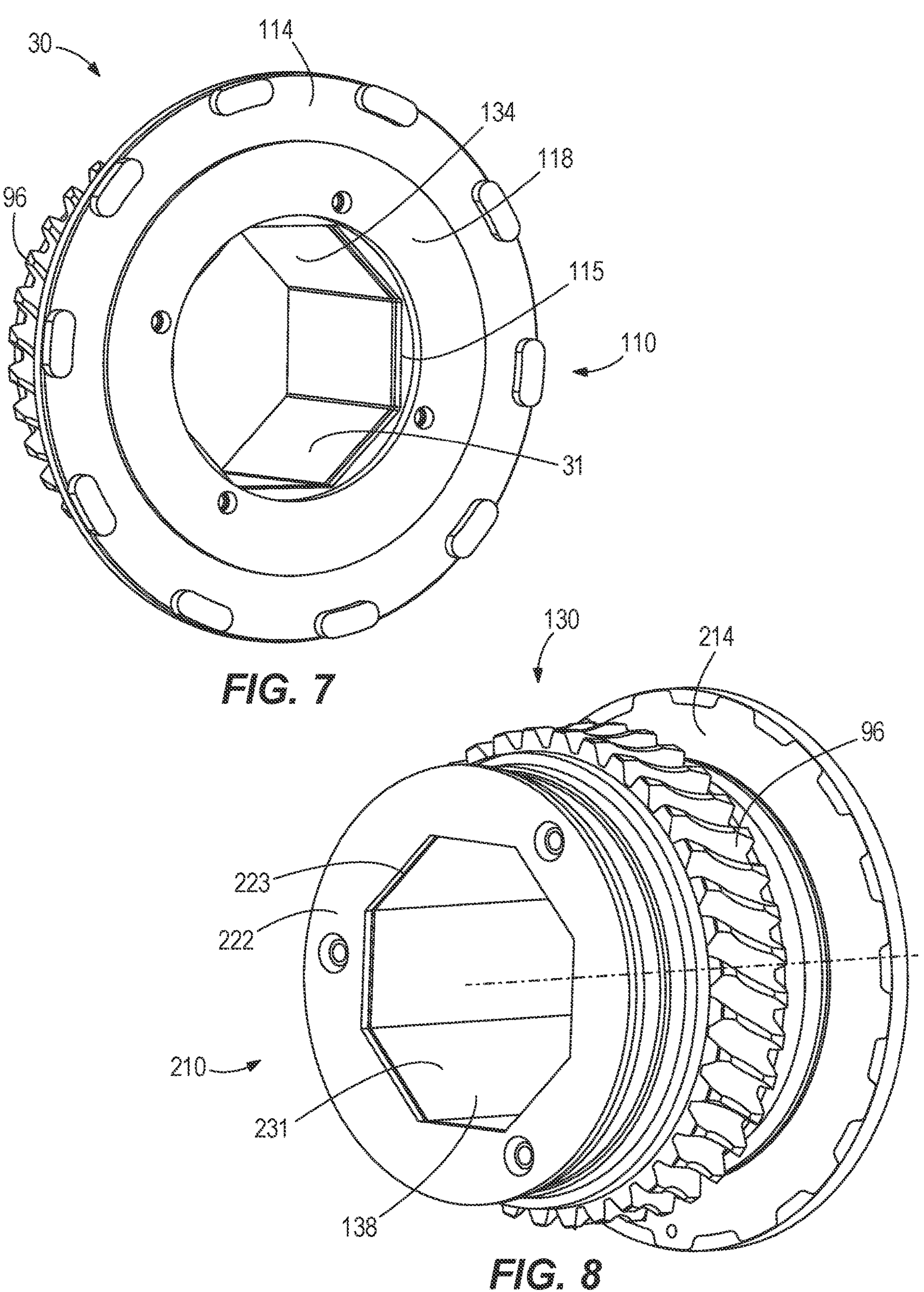
FIG. 7 is a front, perspective view of an embodiment of a die holder for use with the threader of FIGS. 1 and 2.
FIG. 8 is a perspective view of another embodiment of a die holder for use with the threader of FIGS. 1 and 2.
Figure 17:
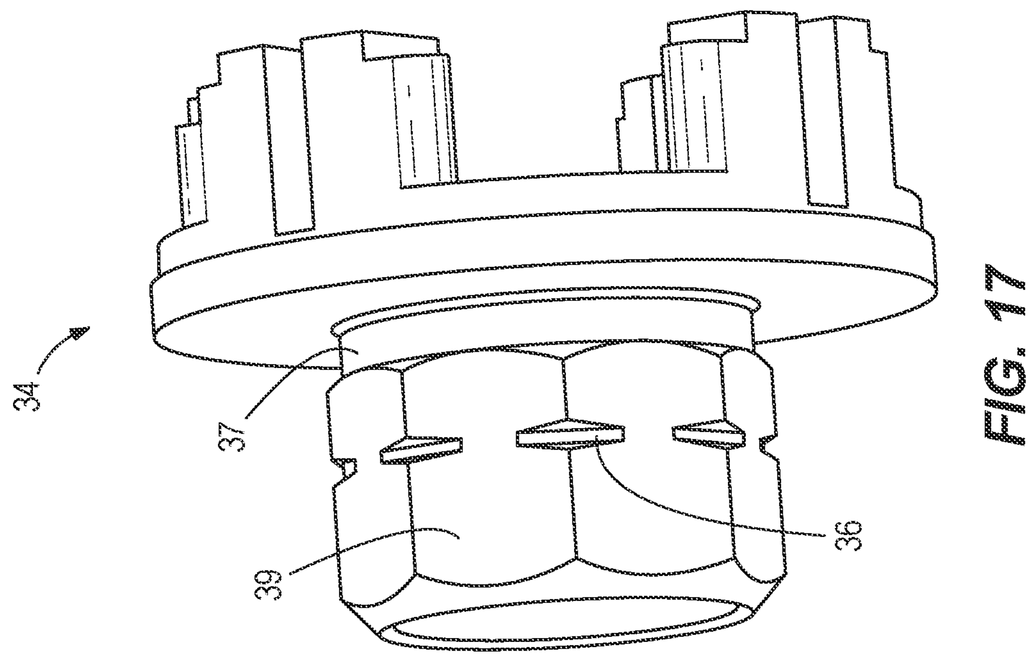
FIG. 17 is a side, perspective view of a cutting die for use with the threader of FIGS. 1 and 2.

FIG. 7 illustrates the die holder 30 for use with the threader 10 and the die head 34. The die holder 30 includes a rotatable body 134 having an internal octagonal portion 31 for receiving an outer octagonal portion 39 (FIG. 17) of the die head 34 and an external periphery on which the worm gear 96 is formed. The die holder 30 further includes a die locking mechanism 110 configured to rotationally lock the die head 34 in the die holder 30. The die locking mechanism 110 includes a first lock ring 114 disposed on a first side of the die holder 30 having an octagonal pattern 115 matching the internal octagonal portion 31, and a retaining plate 118 coupled to the first lock ring 114 for retaining the first lock ring 114 on the die holder 30. To lock the die head 34 in the die holder 30, the user aligns the outer octagonal portion 39 of the die head 34 with the corresponding internal octagonal portion 31 of the die holder 30 and inserts the die head 34 into the die holder 30. Next, the user rotates the first lock ring 114 (e.g., by 22.5 degrees) to misalign the octagonal pattern 115 with the corresponding outer octagonal portion 39 on the die head 34 to rotationally lock the die head 34 within the die holder 30.

Figures 9, 10:
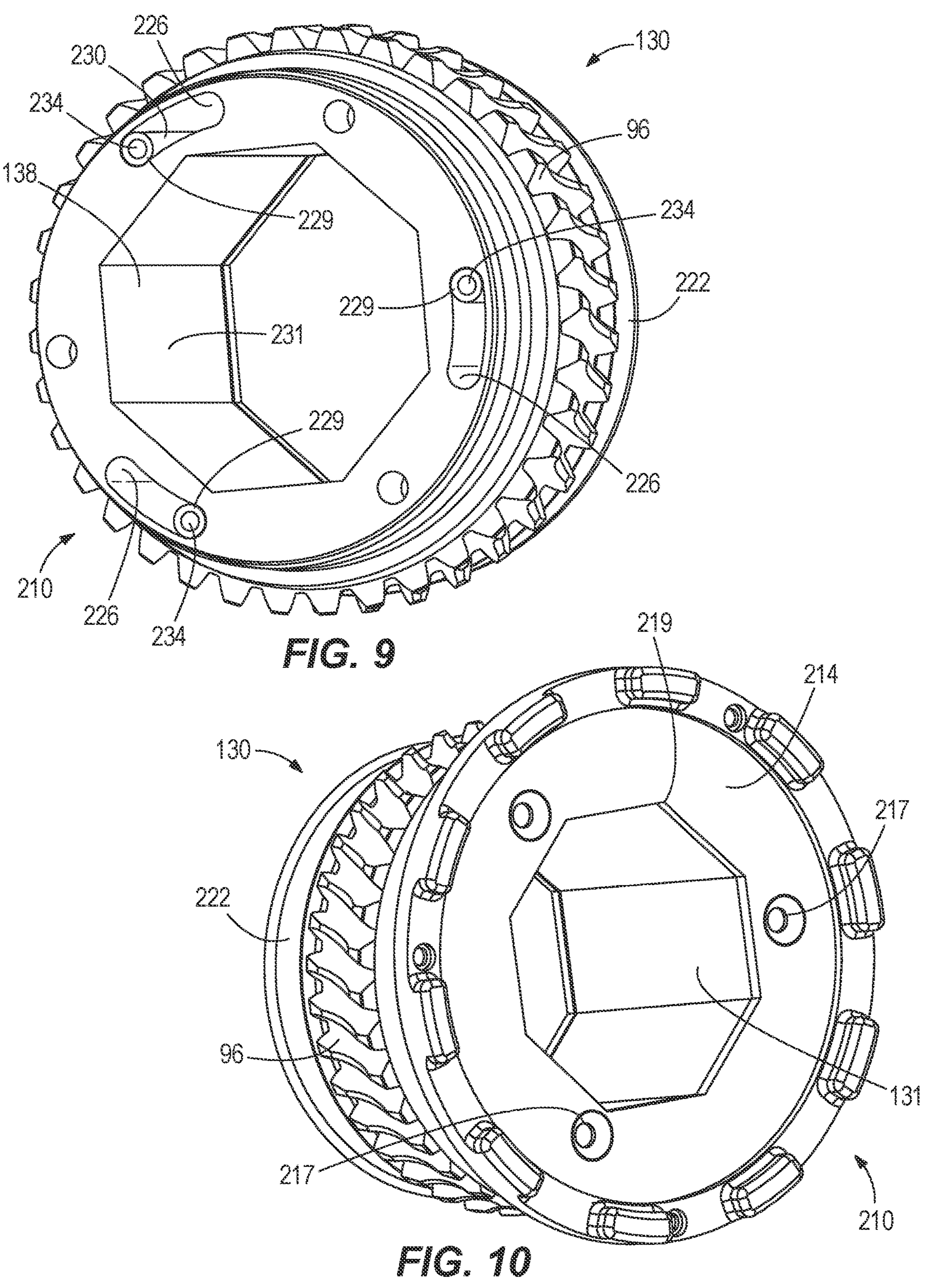
FIG. 9 is a rear perspective view of the die holder of FIG. 7.
FIG. 10 is front perspective view of the die holder of FIG. 7.

FIGS. 8-10 illustrate an alternative embodiment of a die holder 130 for use with the threader 10 and the die head 34. The die holder 130 includes a rotatable body 138 having an internal octagonal portion 231 for receiving the outer octagonal portion 39 (FIG. 17) of the die head 34 and an external periphery on which the worm gear 96 is formed. The die holder 130 further includes a die locking mechanism 210 configured to rotationally lock the die head 34 in the die holder 130. The die locking mechanism 210 includes a first lock ring 214 located on a first side of the die holder 130 having a first octagonal profile 219, a second lock ring 222 located on a second side of the die holder 130 having a second octagonal profile 223, opposite the first side, and a plurality of slots 226 (FIG. 9) radially disposed about the die holder 130 extending through the body 138 to the other side of the die holder 130. Each of the slots 226 includes a respective pin 229 having threaded holes 234 for securing the first and second lock rings 214, 222 to each other on the die holder 130. The pins 229 extend from the first lock ring 214 through the slots 226 and fasteners (not shown) are received through corresponding holes in the second lock ring 222 which are subsequently threaded to the threaded bores 234 with the pins 229. Therefore, the first and second lock rings 214, 222 are rotationally unitized. When the die head 34 is inserted into the die holder 130, the outer octagonal portion 39 is axially captured between the first and second lock rings 214, 222 irrespective of which side of the die holder 130 the user inserts the die head 34 into. And, the torque from the body 138 of the die holder 130 is transferred to the die head 34 through the corresponding shapes of the octagonal portions/profiles 39, 219/223, 231, causing the body 138 of the die holder 130 to rotate when the motor 22 is activated.

To lock the die head 34 in the die holder 130, the user aligns the outer octagonal portion 39 of the die head 34 with the corresponding internal octagonal portion 231 of the die holder 130 on either the first or second side of the die holder 130 and inserts the die head 34 into the die holder 30 so that the outer octagonal portion 39 is captured between the first and second lock rings 214, 222. Next, the user rotates the first and second lock rings 214, 222 (e.g., 22.5 degrees), depending on which side of the die holder 130 the user decided to insert the die head 34 into, which misaligns the octagonal portions 219, 223 with the corresponding outer octagonal portion 39 on the die head 34 to rotationally lock the die head 34 within the die holder 130. By allowing the user to choose which side of the die holder 130 to mount the die head 34, and subsequently lock the die head 34 on, this prevents the need to reposition the threader 10 for threading an object on an opposite side of the die holder 130 to which the die head 34 is mounted. Furthermore, it eliminates the need to clamp/re-clamp the clamping arm 60 into a new position. Additionally, the dual functionality of the die holder 130 allows for the threader 10 to be used in tight or awkward spaces where other conventional threaders only having the capability to mount and lock a thread cutting die to only one side of the holder would struggle to operate in.

Figures 11A, 11B, 12:
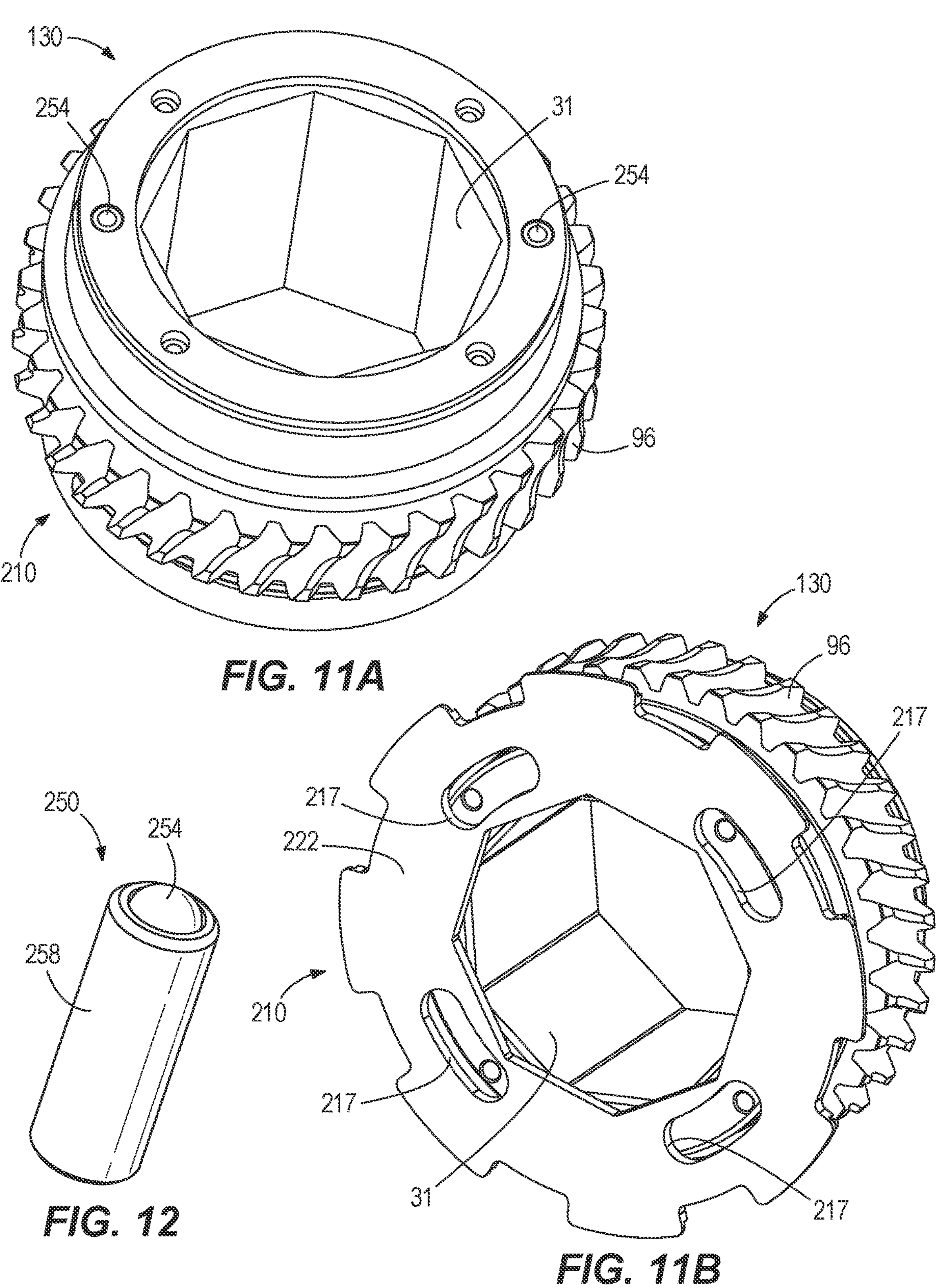
FIG. 11A is a perspective view of the die holder of FIG. 7 with portions removed.
FIG. 11B is a perspective view of the die holder of FIG. 10A.
FIG. 12 is a front perspective view of a detent system for use with the die holder of FIG. 7.
Figure 13A:
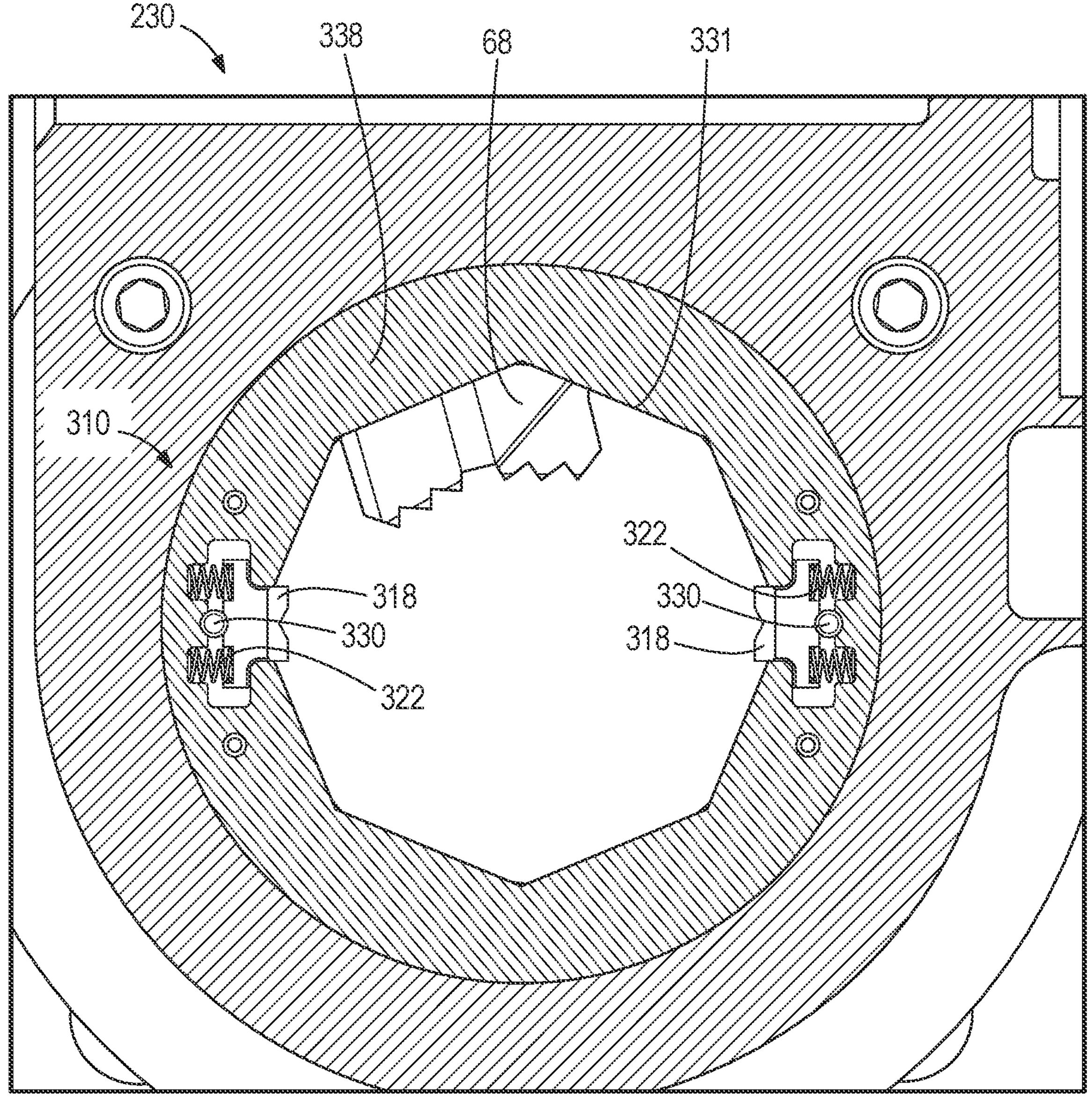
FIG. 13A is a side view of another embodiment of a die holder for use with the threader of FIGS. 1 and 2.
Figure 13B:
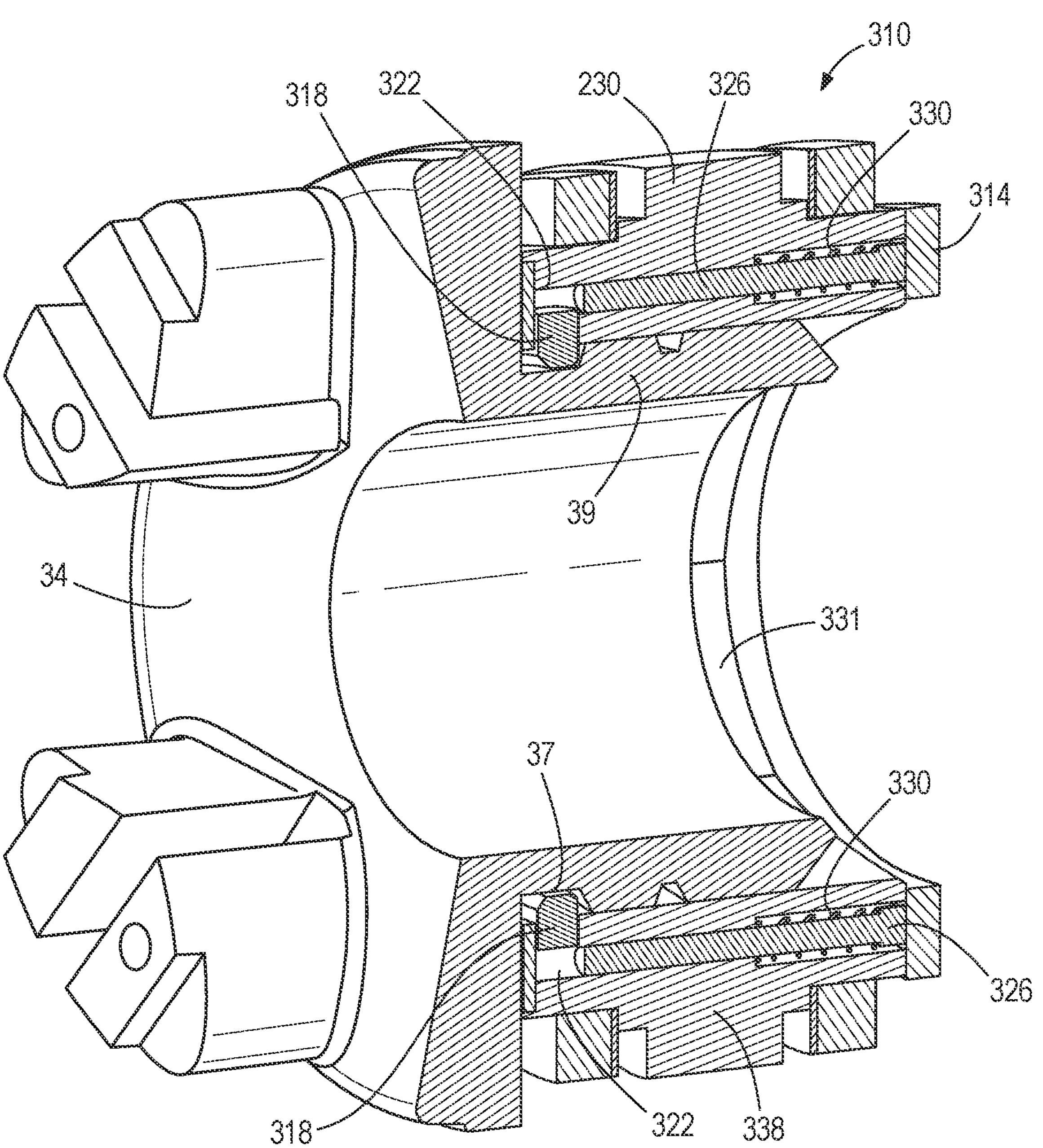
FIG. 13B is a cross-sectional, perspective view of the die holder of FIG. 12A.
Figure 14:
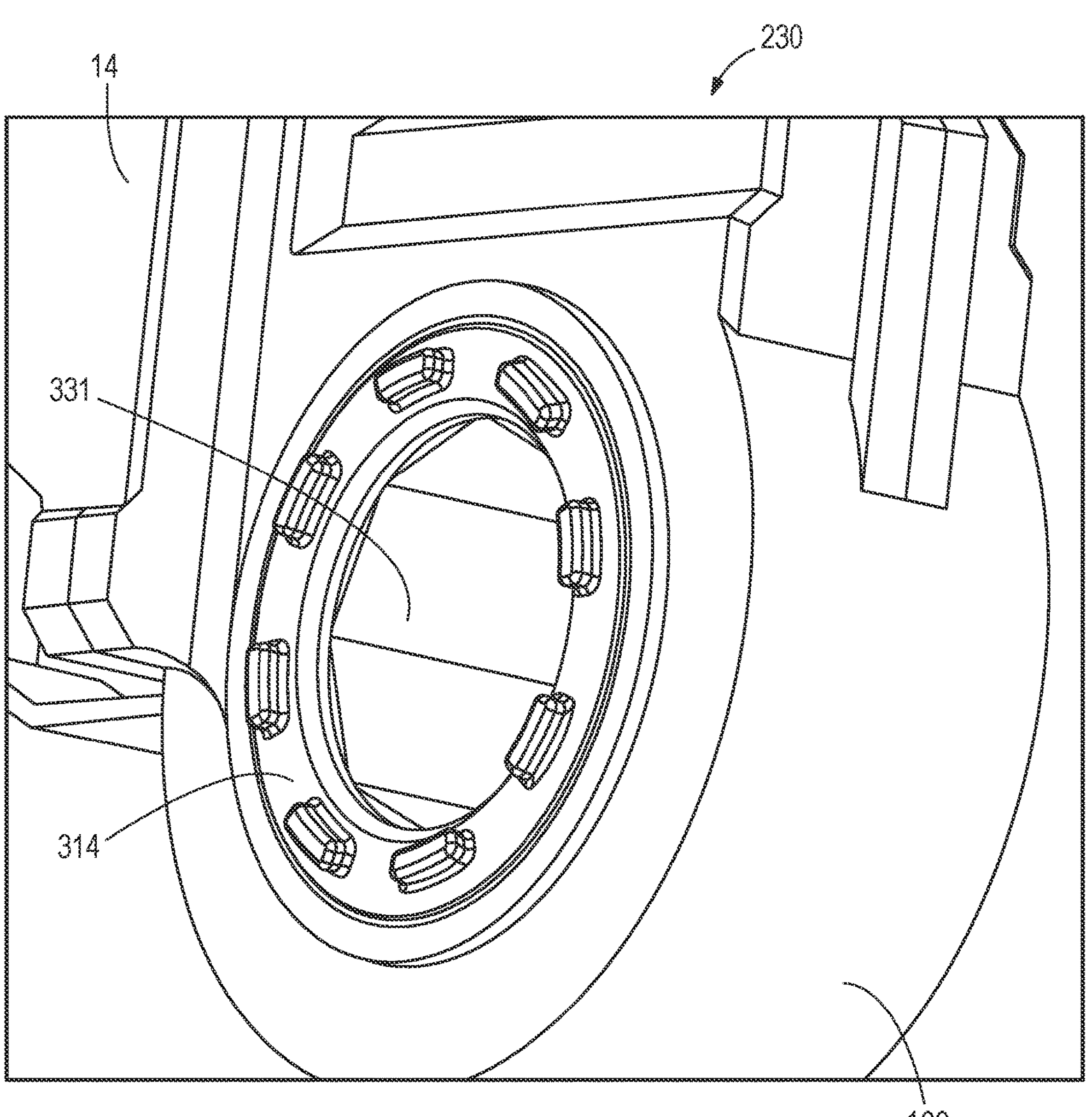
FIG. 14 is a perspective view of the die holder of FIG. 12.

FIGS. 11A, 11B, and 12 illustrate a detent system 250 for use with some embodiments of the die locking mechanism 210. FIGS. 11A and 14B illustrate the die holder 130 including a plurality of detents 254 radially disposed about the body 138 of the die holder 130. The detent system 250 (FIG. 12) includes a spring plunger 258 configured to bias the detents 254 forward from the body 138 of the die holder 130 to contact an inner portion of the second lock ring 222. When the second lock ring 222 is rotated from the locked to unlocked position, or vice versa, the detents 254 are selectively located in respective apertures 217 (FIG. 11B) on the interior of the second lock ring 222 to provide the user with tactile feedback that the second lock ring 222 is rotated into the locked/unlocked position.

FIGS. 13A, 13B, 14, and 15 illustrate another alternative embodiment of a die holder 230 for use with the threader 10 and the die head 34. The die holder 230 includes a rotatable body 238 having an internal octagonal portion 331 for receiving the outer octagonal portion 39 (FIG. 17) of the die head 34 and an external periphery on which the worm gear 96 is formed. The die holder 230 further includes a die locking mechanism 310 configured to rotationally lock the die head 34 in the die holder 230. The die locking mechanism 310 includes a plurality of tabs 318 radially disposed about the body 238 of the die holder 230, each having a plurality of springs 322 for biasing the tabs 318 toward a groove 37 (FIG. 17) on the die head 34, and a plurality of pins 326 formed and axially movable within the die holder 230 each having respective pin springs 330.

The die locking mechanism 310 further includes a lock ring 314 (FIG. 15) for securing the tabs 318 onto the groove 37. The lock ring 314 includes a plurality of ramp portions 334 radially disposed about the lock ring 314 configured to communicate with the plurality of pins 326. The ramp portions 334 are configured to selectively depress the pins 326 against the bias of their respective pin springs 330 into the body 238 of the die holder 230 depending on a lock/unlock state of the lock ring 314. For example, in the unlock state (FIG. 13B), the ramp portions 334 are positioned so that they allow the pin springs 330 to fully extend and bias each of the pins 326 forward within the body of the die holder 230 into engagement with the lock ring 314 to allow the tabs 318 to move freely. Alternatively, in the locked position, the ramp portions 334 are positioned so that they depress the pins 326 rearward into the body 238 of the die holder 230 against the bias of their respective pin springs 330 to radially affix the tabs 318 onto the groove 37 of the die head 34.

To lock the die head 34 in the die holder 230, the user aligns the outer octagonal portion 39 of the die head 34 within the corresponding internal octagonal portion 331 of the die holder 230 and inserts the die head 34 into the die holder 230. As the user inserts the die head 34 into the die holder 230, the outer octagonal portion 39 of the die head 34 pushes the tabs 318 radially outward against the bias of the springs 322 until the tabs 318 contact the groove 37 portion of the die head 34. When the tabs 318 contact the groove 37 portion, the springs 322 rebound, pushing the tabs 318 radially inward onto the groove 37 to loosely retain the die head 34 in the die holder 230. Next, the user rotates (e.g., 22.5 degrees) the lock ring 314, which guides the pins 326 up their respective ramp portions 334 until they are depressed within body of the die holder 230 and in engagement with the each of the tabs 318 to prevent the tabs 318 from moving radially outward. This action biases the tabs 318 radially inward to firmly clamp onto the groove 37 of the die head 34 to rotationally lock the die head 34 within the die holder 230.

Figures 15, 16A:
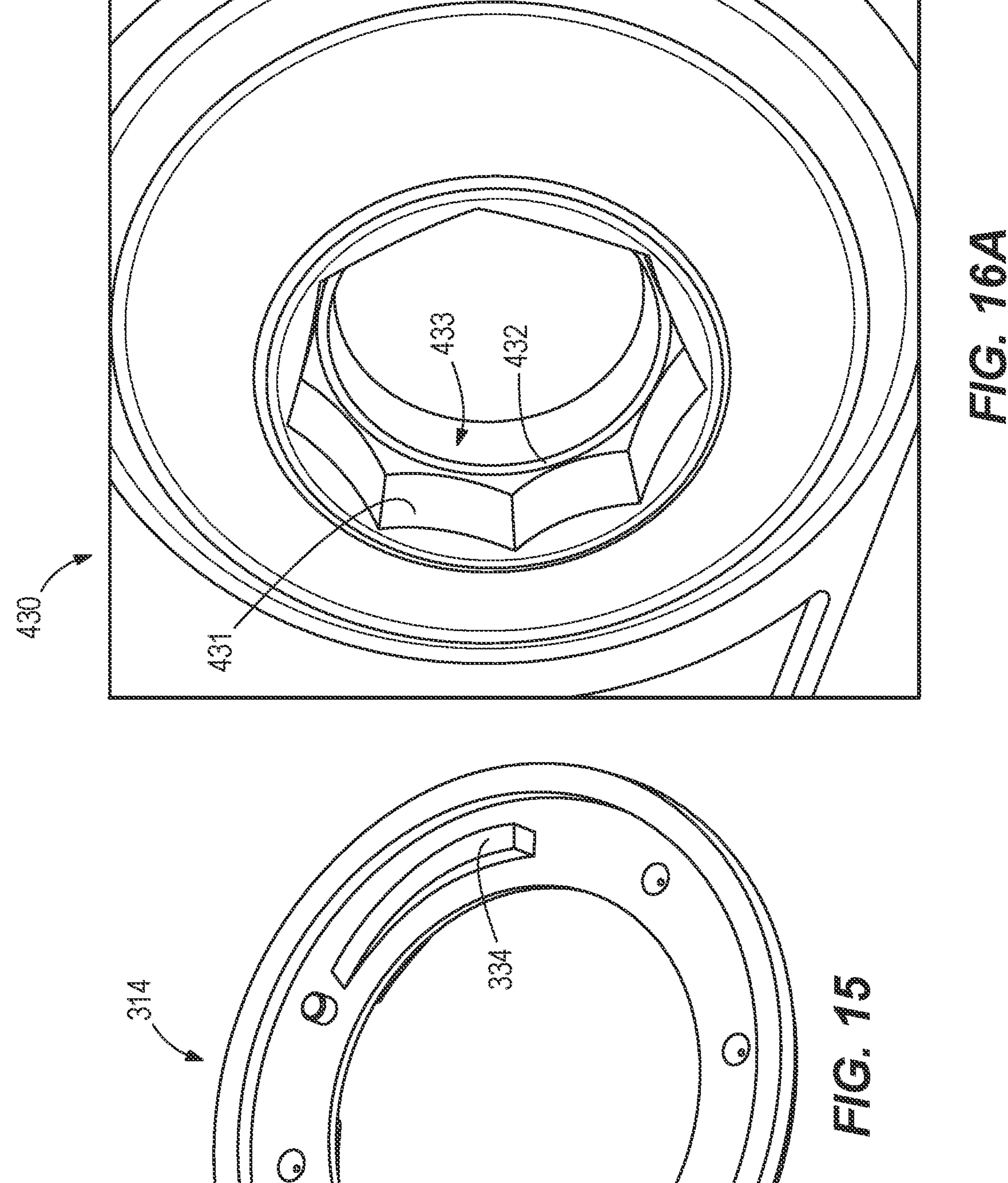
FIG. 15 is a rear, perspective view of a lock ring for use with the die holder of FIG. 12.
FIG. 16A is a perspective view of another embodiment of a die holder for use with the threader of FIGS. 1 and 2.
Figure 16B:
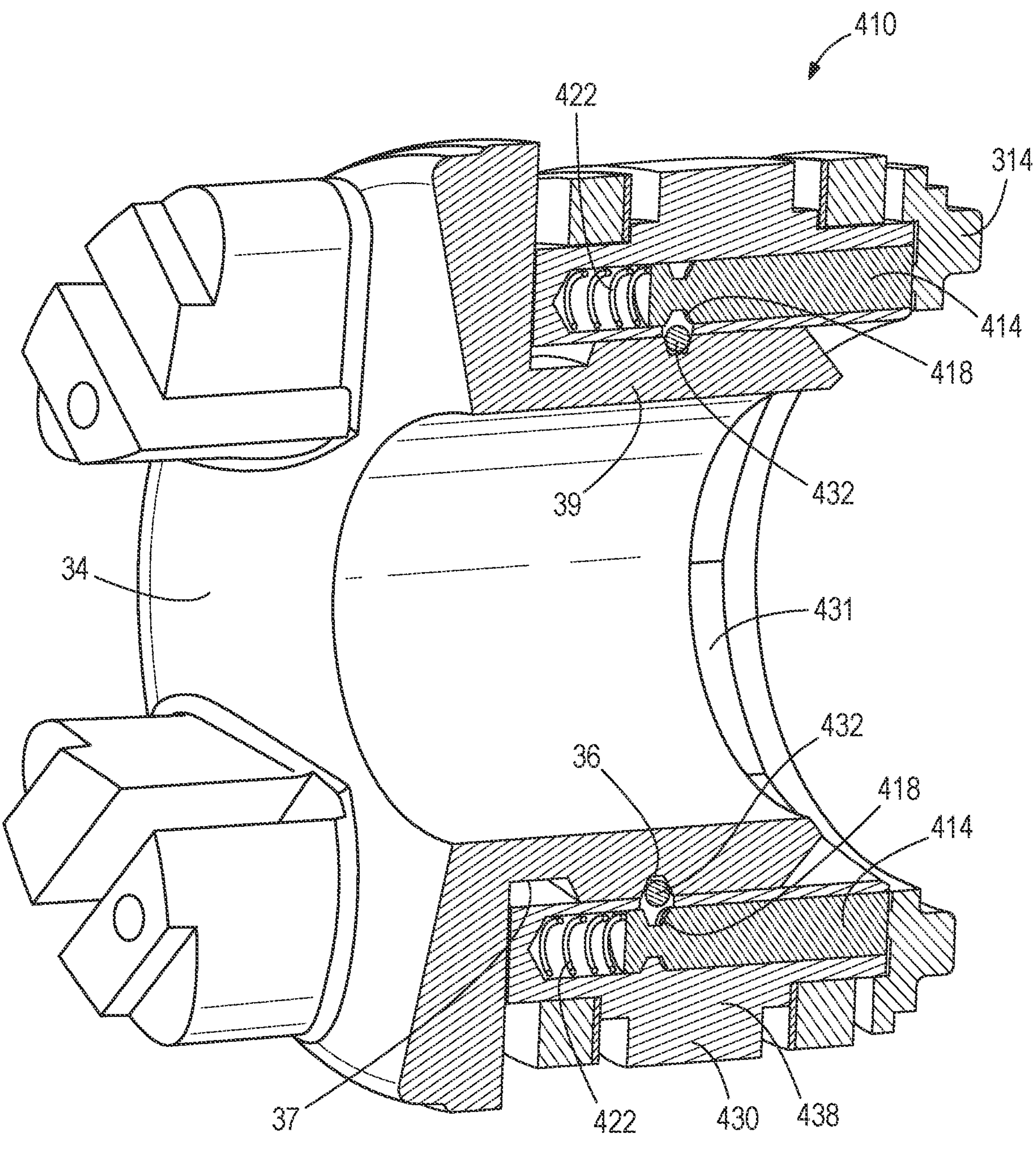
FIG. 16B is a cross-sectional, perspective view of the die holder of FIG. 15A.

FIGS. 16A-16B illustrate another alternative embodiment of a die holder 430 for use with the threader 10 and the die head 34. The die holder 430 includes a rotatable body 438 having an internal octagonal portion 431 for receiving the outer octagonal portion 39 (FIG. 17) of the die head 34 and an external periphery on which the worm gear 96 is formed. The die holder 430 further includes a die locking mechanism 410 (FIG. 16B) configured to rotationally lock the die head 34 in the die holder 430, and a retaining ring 432 having a lip portion 433 circumferentially extending about the retaining ring 432 for comingling with the die locking mechanism 410.

The die locking mechanism 410 includes a plurality of pins 414 formed and axially movable within the body 134 of the die holder 430 each having a relief portion 418 for selectively receiving the lip portion 433 of the retaining ring 432, the lock ring 314 for selectively engaging the plurality of pins 414 with the ramp portions 334, and a plurality of pin springs 422 for biasing each of the pins 414 toward engagement with the lock ring 314.

To lock the die head 34 in the die holder 430, the user aligns the outer octagonal portion 39 of the die head 34 within the corresponding internal octagonal portion 431 of the die holder 430 and inserts the die head 34 into the die holder 230 such that a retainment groove 36 on the outer octagonal portion 39 is completely received by the lip portion 433 of the retaining ring 432, and the relief portion 418 of each of the pins 414 is also arranged over the lip portion 433. Next, the user rotates (e.g., 22.5 degrees) the lock ring 314, which guides the ramp portions 334 into engagement with the each of the pins 414 and biases the pins 414 axially rearward against the bias of their respective pin springs 422 to misalign each of the relief portions 418 with the lip portion 433 of the retaining ring 432. This misalignment firmly clamps the retaining ring 432 within the retainment groove 36 on the die head 34 to rotationally lock the die head 34 within the die holder 430.

Figure 19A:
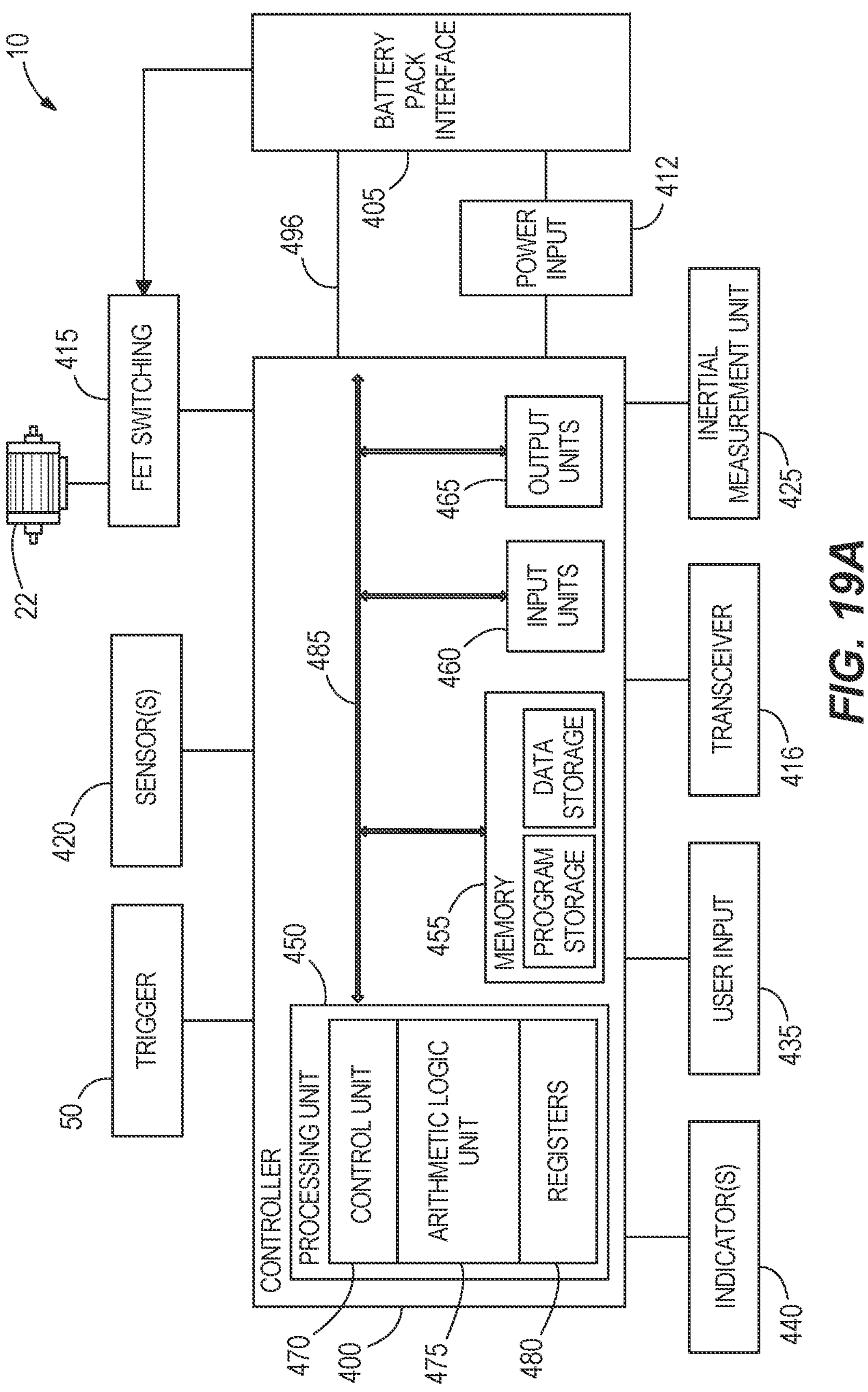
FIG. 19A is a block diagram of the pipe threader of FIG. 1 in accordance with some embodiments of the invention.

FIG. 19A illustrates a block diagram of the pipe threader 10. In the example illustrated, the pipe threader 10 includes a controller (for example, an electronic processor 400) electrically and/or communicatively connected to a variety of modules or components of the pipe threader 10. For example, the illustrated electronic processor 400 is connected to a battery pack interface 405, a power input module 412, a FET switching module 415, one or more sensors 420, a transceiver 416, a user input module 435, one or more indicators 440, and the trigger 50. The electronic processor 400 includes combinations of hardware and software that are operable to, among other things, control operation of the pipe threader 10, activate one or more indicators 440, monitor the operation of the pipe threader 10, communicate with an associated external device (e.g., a smartphone) and the like.

In some embodiments, the electronic processor 400 includes a plurality of electrical and electronic components that provide power, operational control, and protection to the components and modules within the electronic processor 400 and/or the pipe threader 10. For example, the electronic processor 400 includes, among other things, a processing unit 450 (e.g., a microprocessor, a microcontroller, an electronic processor, or another suitable programmable device), a memory 455, input units 460, and output units 465. The processing unit 450 includes, among other things, a control unit 470, an arithmetic logic unit ("ALU") 475, and a plurality of registers 480 (shows as a group of registers in FIG. 19A), and is implemented using a known computer architecture, such as a modified Harvard architecture, a von Neumann architecture, etc. The processing unit 450, the memory 455, the input units 460, and the output units 465 as well as the various modules connected to the electronic processor 400 are connected by one or more control and/or data buses (e.g., a common bus 485). The control and/or data buses are shown generally in FIG. 19A for illustrative purposes. The use of one or more control and/or data buses for the interconnection between and communication among the various modules and components would be known to a person skilled in the art in view of the invention described herein.

The memory 455 is a non-transitory computer readable medium and includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 450 is connected to the memory 455 and executes software instructions that are capable of being stored in a RAM of the memory 455 (e.g., during execution), a ROM of the memory 455 (e.g., on a generally permanent basis), or another non-transitory computer readable medium such as another memory or a disc. Software included in the implementation of the pipe threader 10 can be stored in the memory 455 of the electronic processor 400. The software includes, for example, firmware, one or more applications, program data, filters, rules, one or more program modules, and other executable instructions. The electronic processor 400 is configured to retrieve from memory and execute, among other things, instructions related to the control processes and methods described herein. In other constructions, the electronic processor 400 includes additional, fewer, or different components.

The battery pack interface 405 includes a combination of mechanical and electrical components configured to and operable for interfacing with the battery pack 38. For example, power provided by the battery pack 38 to the pipe threader 10, is provided through the battery pack interface 405 to a power input module 412. The power input module 412 includes combinations of active and passive components to regulate or control the power received from the battery pack 38 prior to power being provided to the electronic processor 400. The battery pack interface 405 also supplies power to the FET switching module 415 to be switched by switching FETs in the FET switching module 415 to selectively provide power to the motor 22. In some embodiments, the pipe threader 10 includes multiple independent FET switching bridges (e.g., including six FETs) in the FET switching module 415. The battery pack interface 405 also includes, for example, a communication line 496 for providing a communication line or link between the electronic processor 400 and the battery pack 38.

The motor 22 is, for example, a brushless direct current (BLDC) motor. The motor 22 is controlled by the user using the trigger 50. The trigger 50 may be implemented as a trigger switch, a push button, a knob, or the like. When the user actuates the trigger 50, the electronic processor 400 controls the FET switching module 415 to control the motor 22. The FET switching module 415 includes an H-bridge or an inverter bridge used for controlling the motor 22. The electronic processor 400 provides PWM signals to the H-bridge or the inverter bridge to control the speed and direction of the motor 22 based on signals received from the trigger 50 and a rotary encoder (e.g., Hall sensors of the motor 22).

Figure 19B:
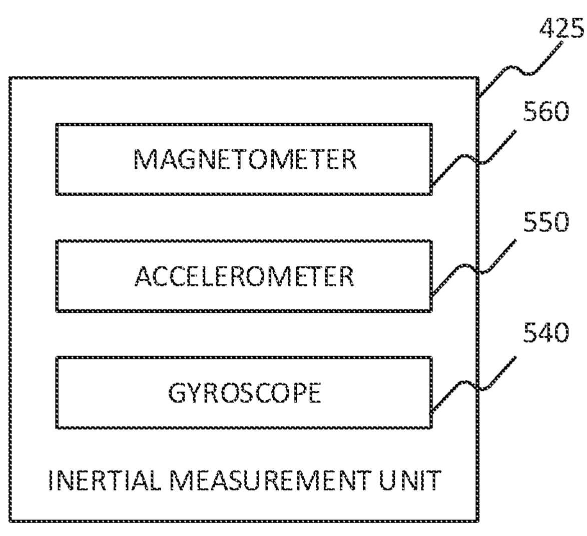
FIG. 19B is a block diagram of the pipe threader of FIG. 1 in accordance with some embodiments of the invention.

The inertial measurement unit 425 is operably coupled to the electronic processor 400 to, for example, provide heading, orientation, location, and movement information of the pipe threader 10 to the electronic processor 400. Referring to FIG. 19B, the inertial measurement unit 425 includes, for example, a 9-axis inertial measurement sensor including a gyroscope 540, an accelerometer 550, and a magnetometer 560. In some embodiments, the inertial measurement unit 425 is a 6-axis inertial measurement sensor including only the gyroscope 540 and the accelerometer 550. The gyroscope 540 provides an orientation of the pipe threader 10, the accelerometer 550 provides an angular position/velocity and a gravitational pull acceleration of the pipe threader 10, and the magnetometer 560 provides a heading of the pipe threader 10. The electronic processor 400 uses the information received from the inertial measurement unit 425 to determine a position and/or orientation of the pipe threader 10. A method for determining the position of the pipe threader 10 is explained below with respect to FIG. 19.

Referring back to FIG. 19A, the transceiver 416 is operably coupled to the electronic processor 400 to, for example, allow wired and/or wireless communication with an external device (e.g., a user's smartphone, a connected display or control unit, and the like). The transceiver 416 allows the electronic processor 400 to receive inputs from the external device and provide outputs for display on the external device. In some embodiments, the trigger 50, the indicators 440, and the user input module 435 may be implemented as inputs and/or outputs on the external device. The inputs from the external device are received through the transceiver 416 and the outputs to the external device are provided through the transceiver 416.

The user input module 435 is operably coupled to the electronic processor 400 to, for example, select a direction of operation, a torque, and/or speed setting of the motor 22. For example, the user input module 435 includes an ON/OFF switch to turn the pipe threader 10 on or off and a direction switch to select a direction of rotation of the pipe threader 10. In some embodiments, the user input module 435 includes a combination of digital and analog input or output devices required to achieve a desired level of operation for the pipe threader 10, such as one or more knobs, one or more dials, one or more switches, one or more buttons, a touch screen, etc. In some embodiments, the trigger 50 is part of the user input module 435. The indicators 440 include, for example, one or more light-emitting diodes ("LED"). The indicators 440 can be configured to display conditions of, or information associated with the pipe threader 10. In some embodiments, the indicators 440 may be part of a connected display or may be provided in an external device.

Figure 20:
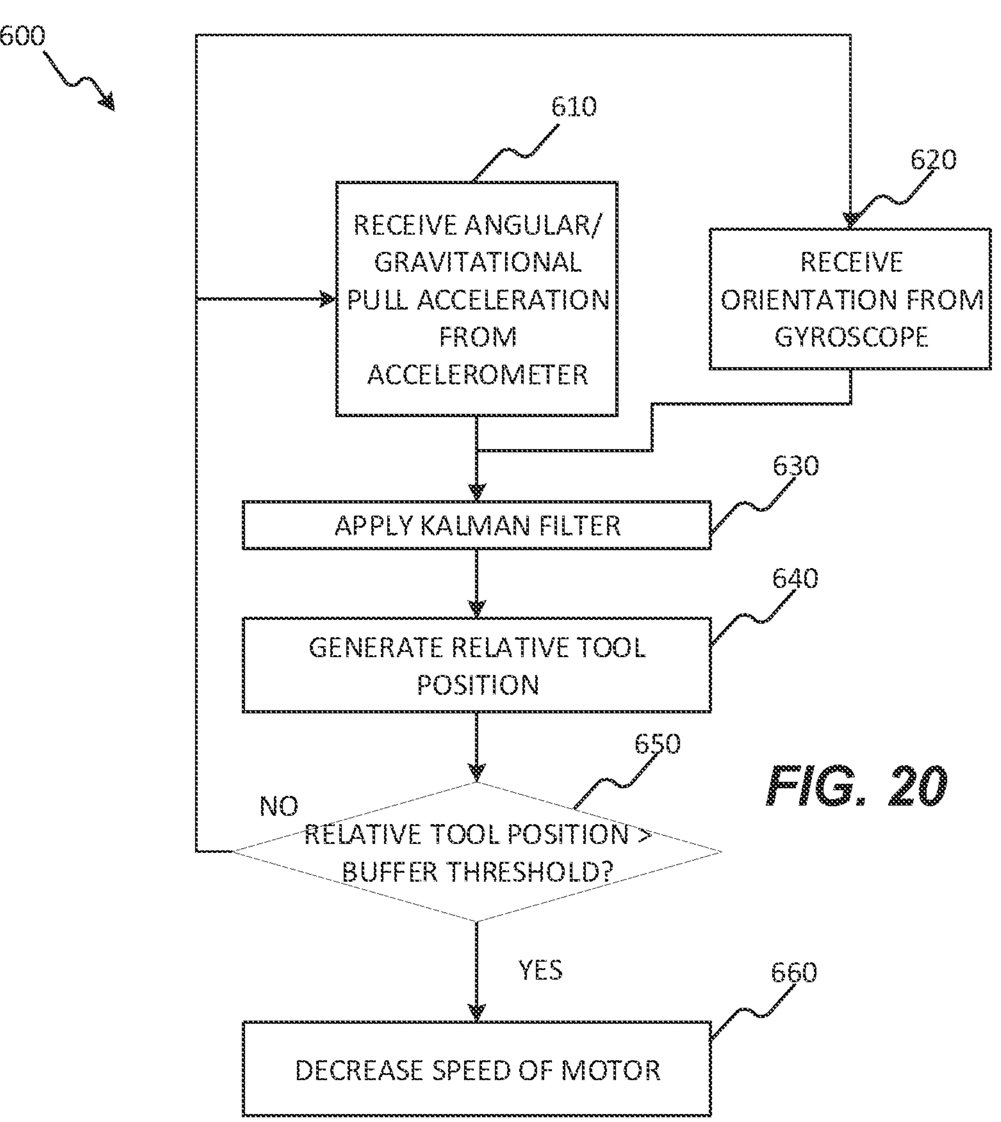
FIG. 20 is a flow chart of the pipe threader of FIG. 1 in accordance with some embodiments of the invention.

FIG. 20 is a flowchart of an example method 600 for adaptive control of the pipe threader 10. The method 600 includes receiving, at the electronic processor 400, an angular or gravitational pull acceleration from the accelerometer 550 (at block 510) and an orientation from the gyroscope 540 (at block 620). The electronic processor 400 receives the angular or gravitational pull acceleration and the orientation from the inertial measurement unit 425. In some embodiments, the electronic processor 400 also receives the heading from the magnetometer 560.

The method 600 includes applying, using the electronic processor 400, a Kalman filter to the measurements received from the inertial measurement unit 425 (at block 630) and generating relative tool position of the pipe threader 10 (at block 640). Applying the Kalman filter provides the relative tool position. Specifically, the relative tool position can be determined with respect to the rotational axis 32. The method 600 further includes determining, using the electronic processor 400, whether the relative tool position exceeds a buffer threshold (at block 650). The buffer threshold may be stored in the memory 455. The buffer threshold may be selected to establish a relative position at which the quality of the threading process decreases. The buffer threshold indicates a relative radial on longitudinal distance around the rotational axis 32.

When the relative tool position exceeds the buffer threshold, the method 600 includes decreasing, using the electronic processor 400, a speed of the motor 22 (at block 660). As discussed above, the electronic processor 400 adjusts the PWM signals provided to the power switching network 215 to decrease the speed of the motor 22. Decreasing the speed of the motor 22 allows the user to regain control of the pipe threader 10 when, for example, the pipe threader 10 begins to jitter.

Although the invention has been described in detail with reference to certain preferred embodiments, variations and modifications exist within the scope and spirit of one or more independent aspects of the invention as described.

Various features of the invention are set forth in the following claims.

What is claimed is:

1. A pipe threader configured to rotate a die head with cutting dies, the pipe threader comprising:

a housing;

an electric motor supported in the housing;

a battery coupled to the housing to power the electric motor;

a die holder that receives torque from the electric motor causing the die holder to rotate, the die holder defining a rotational axis; and a die locking mechanism configured to rotationally lock the die head received within the die holder, the die locking mechanism including a first lock ring on a first side of the die holder, and a second lock ring coupled to the first lock ring on a second side of the die holder opposite the first side, wherein the first lock ring and the second lock ring are each configured to rotate about the rotational axis with respect to the die holder to engage an outer surface of the die head to selectively mount the die head in the die holder, and wherein the first lock ring defines a first octagonal pattern opening, the second lock ring defines a second octagonal pattern opening, the die head defines an internal octagonal surface portion, each of the first lock ring and the second lock ring is rotatable between an alignment position and a misalignment position, in respective misaligned positions, the first and second pattern openings are misaligned with the internal octagonal surface.

2. The pipe threader of claim 1 further comprising a detent system, the detent system including a plurality of detents radially disposed about the die holder and a plurality of spring plungers, each spring plunger biasing one of the detents toward and engaging the second lock ring.

3. The pipe threader of claim 1, wherein the housing includes a connection loop configured to receive a clamp.

4. The pipe threader of claim 3, wherein a handle extends from the housing and the connection loop is integrated with the handle.

5. The pipe threader of claim 3, wherein the connection loop is located on a bottom of the pipe threader.

6. The pipe threader of claim 1, wherein the housing includes an air intake vent, an air exhaust vent, and a plurality of mesh coverings disposed over the air intake vent and the air exhaust vent.

7. The pipe threader of claim 1, wherein at least one light emitting diode is supported in the housing adjacent the die holder.

8. The pipe threader of claim 1, further comprising a multi-stage planetary transmission configured to receive torque from the motor, and a worm drive configured to receive torque from the transmission and provide torque to the die holder.

* * * * *